(12) United States Patent
Menz et al.

(10) Patent No.: US 12,528,399 B2
(45) Date of Patent: *Jan. 20, 2026

(54) GRAIN TRAILER

(71) Applicant: Trail King Industries, Inc., Mitchell, SD (US)

(72) Inventors: Kelly L. Menz, Horace, ND (US); James R. Schindler, Yankton, SD (US); Bryan S. Brodeur, Yankton, SD (US)

(73) Assignee: TRAIL KING INDUSTRIES, INC., Mitchell, SD (US)

( * ) Notice: Subject to any disclaimer, the term of this patent is extended or adjusted under 35 U.S.C. 154(b) by 394 days.

This patent is subject to a terminal disclaimer.

(21) Appl. No.: 18/129,736

(22) Filed: Mar. 31, 2023

(65) Prior Publication Data

US 2023/0234491 A1 Jul. 27, 2023

Related U.S. Application Data

(63) Continuation of application No. 17/064,437, filed on Oct. 6, 2020, now Pat. No. 11,618,365.
(Continued)

(51) Int. Cl.
*B60P 1/56* (2006.01)
*B60P 3/00* (2006.01)
*B62D 27/00* (2006.01)
*B62D 29/00* (2006.01)
*B62D 29/04* (2006.01)
*B62D 53/06* (2006.01)

(52) U.S. Cl.
CPC ...... *B60P 1/56* (2013.01); *B60P 3/00* (2013.01); *B62D 27/00* (2013.01); *B62D 29/008* (2013.01); *B62D 29/041* (2013.01); *B62D 53/06* (2013.01)

(58) Field of Classification Search
CPC ..... B60P 1/56; B60P 3/00; B62D 27/00; B62D 29/008; B62D 53/06
USPC ............................................................ 298/29
See application file for complete search history.

(56) References Cited

U.S. PATENT DOCUMENTS

| | | | |
|---|---|---|---|
| 3,138,116 A | 6/1964 | Dorey | |
| 3,241,730 A | 3/1966 | Dorey | |

(Continued)

FOREIGN PATENT DOCUMENTS

| | | |
|---|---|---|
| CA | 2123815 | 11/1994 |
| CA | 2877266 | 7/2016 |

OTHER PUBLICATIONS

Timpte; product; https://www.itagequipment.com/for-sale/2016-timpte-42x96-hopper-grain-trailer-66-inch-sides-air-ride-manual-tarp-13306295; ITAGEquipment; accessed Jun. 26, 2025; published 2016. (Year: 2016).*

(Continued)

*Primary Examiner* — Amy R Weisberg
*Assistant Examiner* — Philip Charles Adams
(74) *Attorney, Agent, or Firm* — Nelson Mullins Riley & Scarborough LLP

(57) ABSTRACT

A semi-trailer for use in hauling grain has four sides and two sloped cargo areas, each having a hopper funnel made of a continuous, unitary polymer material. A door below each hopper is driven by a linear actuator that is disposed above the level of the door. The trailer sidewalls are made of a composite material having inner and outer panels attached to a center panel by adhesive.

12 Claims, 16 Drawing Sheets

Related U.S. Application Data

(60) Provisional application No. 62/911,866, filed on Oct. 7, 2019.

(56) References Cited

U.S. PATENT DOCUMENTS

| | | |
|---|---|---|
| 3,635,170 A | 1/1972 | Chierici |
| 3,933,100 A | 1/1976 | Dugge |
| 4,301,741 A | 11/1981 | Chierici |
| 4,342,267 A | 8/1982 | Blout |
| 4,498,264 A | 2/1985 | McCafferty et al. |
| 4,715,515 A | 12/1987 | Steilen |
| 5,000,358 A | 3/1991 | Dugge |
| 5,046,432 A | 9/1991 | Bowler |
| 5,403,062 A | 4/1995 | Sjostedt et al. |
| 5,448,955 A | 9/1995 | Dugge et al. |
| 5,584,251 A | 12/1996 | Lucas |
| 5,671,684 A | 9/1997 | Lucas |
| 6,059,372 A | 5/2000 | McDonald et al. |
| 6,073,562 A | 6/2000 | Cozine et al. |
| 6,085,948 A | 7/2000 | Putze |
| 6,257,150 B1 | 7/2001 | Burke |
| 6,363,863 B1 | 4/2002 | Dohr |
| 6,450,564 B1 | 9/2002 | Sill |
| 6,736,297 B2 | 5/2004 | Kassian et al. |
| 6,793,271 B1 | 9/2004 | Deets |
| 6,802,521 B1 | 10/2004 | Boughton |
| 6,899,038 B2 | 5/2005 | Fortuna |
| 6,923,493 B2 | 8/2005 | Buchholz et al. |
| 6,932,433 B2 | 8/2005 | Heider et al. |
| 7,378,000 B2 | 5/2008 | Lemmons |
| 7,478,865 B2 | 1/2009 | Klein |
| 7,621,589 B1 | 11/2009 | Gerome |
| 7,677,642 B2 | 3/2010 | Wylezinski |
| 7,819,464 B2 | 10/2010 | Haub et al. |
| 7,901,537 B2 | 3/2011 | Jones et al. |
| 7,914,034 B2 | 3/2011 | Roush |
| 7,931,328 B2 | 4/2011 | Lewallen et al. |
| 7,950,722 B2 | 5/2011 | Booher |
| 8,186,747 B2 | 5/2012 | Bloodworth et al. |
| 8,465,073 B2 | 6/2013 | Roeder |
| 8,720,974 B2 | 5/2014 | Hurst et al. |
| 8,746,152 B2 | 6/2014 | Charney et al. |
| 8,757,704 B2 | 6/2014 | Zhao et al. |
| 8,925,467 B2 | 1/2015 | Kennedy et al. |
| 8,998,295 B2 | 4/2015 | Katz et al. |
| 9,340,140 B1 | 5/2016 | Blitterswijk et al. |
| 9,393,970 B2 | 7/2016 | Senn et al. |
| 9,469,352 B2 | 10/2016 | Booher et al. |
| 9,659,451 B2 | 5/2017 | Olive |
| 9,708,013 B2 | 7/2017 | Belpaire |
| 9,950,713 B2 | 4/2018 | Senn et al. |
| 2002/0100390 A1 | 8/2002 | Jwuc et al. |
| 2005/0042433 A1* | 2/2005 | Jones ............... B32B 27/00 428/292.1 |
| 2008/0143142 A1 | 6/2008 | Lemmons |
| 2010/0270848 A1 | 10/2010 | Heider et al. |
| 2014/0130657 A1 | 5/2014 | Pipel et al. |

OTHER PUBLICATIONS

Barn World; product website; https://www.barnworld.com/cattle-guards/plastic-grain-bin-feed-bin/; Barn World; accessed Jun. 26, 2025; published Jun. 1, 2018. (Year: 2018).*

* cited by examiner

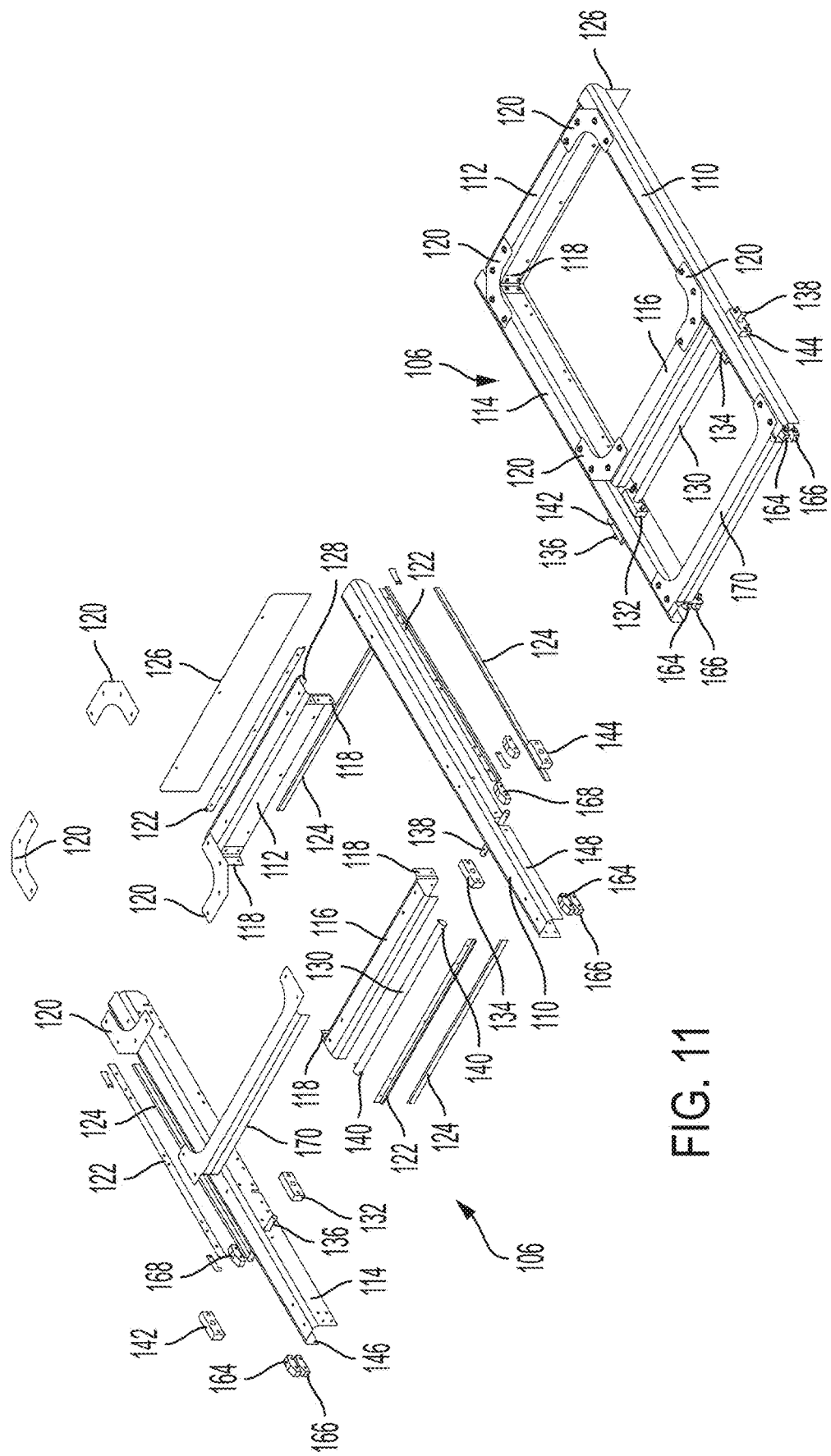

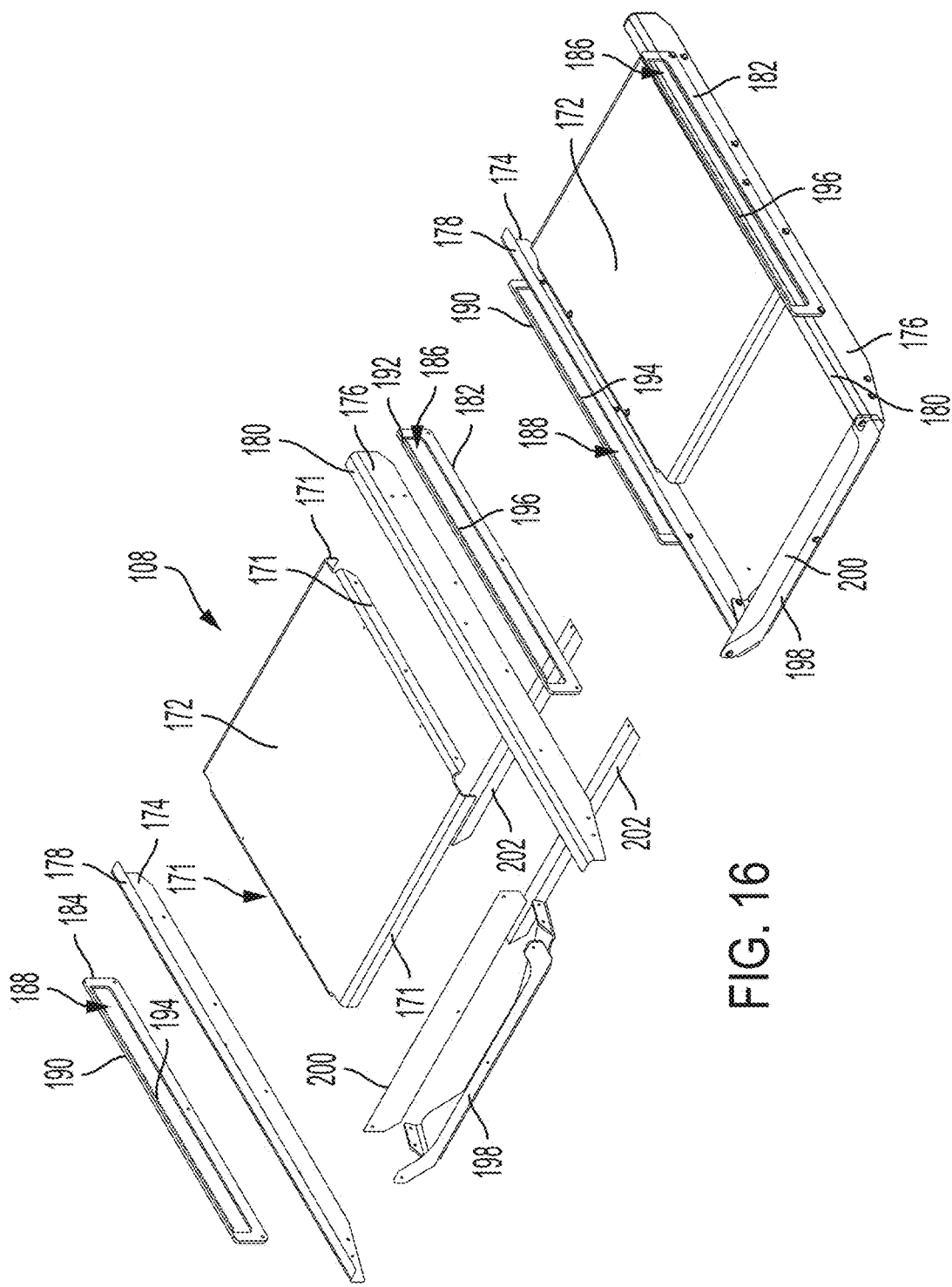

GRAIN TRAILER

CROSS-REFERENCE TO RELATED APPLICATION

The present application is a continuation of U.S. application Ser. No. 17/064,437, filed Oct. 6, 2020 (now U.S. Pat. No. 11,618,365), which claims priority to U.S. provisional patent application No. 62/911,866, filed Oct. 7, 2019, entitled GRAIN TRAILER, the entire disclosure of each of which is hereby incorporated by reference herein.

BACKGROUND

Semi-trailer trucks are used to transport large quantities of manufactured goods, produce, livestock, building materials, etc., often over great distances. One type of semi-trailer, typically used to carry grain, includes a wheeled chassis comprised of a subframe, sometimes referred to as a "bogie," at the trailer's rear that supports two axles with dual-wheel hubs so that the subframe supports two tandem rows of four wheels each. The chassis includes a pair of retractable legs disposed underneath and at the forward end of the trailer. A subframe forward of the retractable legs includes a downward-extending kingpin. A pair of aluminum bottom rails extend from front to back along the trailer's entire length and attach to the kingpin subframe, the retractable legs, and the bogie. The kingpin is received by a fifth wheel of a semi-truck tractor, as should be understood. The connection of the kingpin subframe to the bottom rails transfers load applied by the tractor, through the fifth wheel and the kingpin, to the trailer body.

The trailer body has a front wall, a rear wall, and two sidewalls that extend, on opposite sides of the trailer, from the front wall to the rear wall. The side bottom rails discussed above are attached to the bottom of the sidewalls, and a pair of respective top rails are attached to the tops of the sidewalls and also extend the trailer's length. Each of the front wall and rear wall has a top rail and a bottom rail that attach to the side bottom and top rails via corner posts at the trailer's four corners.

A cargo deck disposed within the volume defined by the sidewalls, the front wall, and the rear wall divides that volume into two sub-volumes. At the trailer's forward end, a planar aluminum or steel deck section is attached at one end to the front wall top rail and the front ends of the side top rails and at its opposite end to the two opposing side bottom rails at about one-quarter of the trailer's length, thereby forming a slope from the front top rail down to the trailer bottom. A similar sloped deck portion attaches to the rear wall top rail and the rear ends of the two side top rails and slopes down to attach to the side bottom rails at about three-quarters of the trailer's length. At the trailer's center, a vertical wall extends across the upper part of the trailer's interior, attached to the side wall top rails and extending about three-quarters deep into the trailer's interior. The bottom of the vertical wall attaches to two sloped sections, one extending downward from the center wall to the trailer bottom in a forward direction toward the front of the trailer and the other similarly extending downward from the center wall but toward the trailer's rear. Each of the center sloped sections attaches to the two sidewall bottom rails and extends across the trailer's interior, as do the front and rear sloped sections. Accordingly, the forward sloped section, the center wall, and the sloped section extending forward from the center wall defines a forward sub-volume of the trailer's interior, while the center wall, the sloped section extending rearward from the center wall, and the rear sloped section define a rear sub-volume.

As reflected above, a gap would be defined between the forward sloped section, the sloped section extending forward from the center wall, and the two sidewalls. A similar gap would exist between the rear sloped section, the sloped section extending rearwardly from the center wall, and the two sidewalls. The deck further comprises, however, a pair of hoppers that fill those gaps. Each hopper is a funnel-shaped structure having four sides, where each side extends downward, at an acute angle, from a respective one of the bottom edge of the sloped section (front or rear, as the case may be), the sloped section extending from the wall, and the two sidewalls. The hopper is formed by four metal sheets corresponding to the four sides, and that are attached to each other by weldment or screws. Some hoppers comprise two discrete sheets attached to each other. The bottom of each hopper define a four-sided hole. Since the cargo deck in each of the two sub-volumes slopes toward the respective holes, grain held within the cargo volume flows through the holes into a loading container or other receptacle when the holes are open. To close the holes for the trailer's transport, a frame is attached around each hole, and a horizontally-slidable door is mounted on the frame. The door is slidable between two positions, one blocking the hole and one leaving the hole open to the space below the trailer. To open and close the door, a rack is attached to the door, and a pinion is attached to the frame, engaged with the rack. An operator rotates the pinion by a handle extending from the pinion. The rack and pinion extend beneath the door. In another trailer, the handle drives a pulley located at the frame, above the level of the door, that moves the door through a belt drive. In another trailer, the door drive includes a linear chain drive.

A plurality of spaced-apart bars extends across the trailer's open top, attached to and between the side top rails, thereby stiffening the overall frame structure. Also attached to the sidewall top rails and extending across the open trailer top is a plurality of spaced-apart tarp bows. A rolled-up tarp is attached to one of the two top rails, at the trailer's exterior. The tarp can be unrolled and pulled over the tarp bows to the other side of the trailer and attached thereto, thereby forming a roof to cover the trailer contents. With the tarp retracted, grain can be loaded into the two sub-volumes from above.

In some trailers, each sidewall was formed in a sheet-and-post construction, comprising an aluminum inner panel, an aluminum outer panel extending the entire length of the trailer on the exterior, and a series of spaced-apart vertical posts disposed between and separating the inner and outer panels, the posts being attached to and extending between the sidewall top rail and bottom rail. The inner and outer panels were attached to the vertical posts by rivets or other fasteners that protruded through the inner panel's and outer panel's exterior surfaces. In another form of trailer, the sidewall was formed by a series of narrow aluminum plates or extrusions disposed sequentially beside each other to form the wall. Thus, the wall comprised a series of panels with vertical seams between the panels. In another trailer, the sidewall is formed of a series of sequential corrugated sheets welded to the top and bottom rails.

SUMMARY

One or more embodiments of a trailer for use with a truck having a tractor has a wheeled chassis having at least one wheeled axle at a rearward end of the wheeled chassis and a support at a forward end of the wheeled chassis, and a body. The body has a cargo deck supported by the wheeled chassis, a front wall at the forward end, a rear wall at the rearward end, and a pair of sidewalls attached to opposing sides of the deck and extending between the front wall and the rear wall so that at least the sidewalls define a cargo volume above the cargo deck. Each sidewall comprises an inner generally planar panel that faces the cargo area, an outer generally planar panel that forms an outer surface of the trailer, and a center panel disposed between and attached to the inner panel and the outer panel that separates the inner panel from the outer panel. The outer panel is attached to the center panel by an adhesive so that an outer surface of the outer panel defines an area opposite the center panel through which no fastener between the outer panel and the center panel protrudes.

In another embodiment, a trailer for use with a truck having a tractor has a wheeled chassis having at least one wheeled axle at a rearward end of the wheeled chassis and a support at a forward end of the wheeled chassis, and a body. The body has a cargo deck supported by the wheeled chassis, a front wall at the forward end, a rear wall at the rearward end, and a pair of sidewalls attached to opposing sides of the deck and extending between the front wall and the rear wall so that at least the sidewalls define a cargo area above the cargo deck. The cargo deck comprises at least one hopper having a funnel at a bottom portion thereof defining an opening that opens to a space beneath the trailer. The hopper comprises a door attached to the body movably between a first position at which the door blocks the opening between the cargo volume and the space beneath the trailer and a second position in which at least part of the opening is open between the cargo volume and the space beneath the trailer. The trailer includes a linear actuator comprising a rack and pinion operatively attached between the door and the body so that actuation of the linear actuator moves the door between the first position and the second position. The linear actuator is disposed above a bottom surface of the door.

In a further embodiment, a trailer for use with a truck having a tractor has a wheeled chassis having at least one wheeled axle at a rearward end of the wheeled chassis and a support at a forward end of the wheeled chassis, and a body. The body comprises a cargo deck supported by the wheeled chassis, a front wall at the forward end, a rearward wall at the rearward end, and a pair of sidewalls attached to opposing sides of the deck and extending between the front wall and the rear wall so that at least the sidewalls define a cargo area above the cargo deck. The cargo deck comprises at least one hopper having a funnel at a bottom portion thereof that defines and surrounds an opening that opens through a space beneath the trailer. The funnel is formed of a single piece of molded polymer.

The accompanying drawings, which are incorporated in and constitute a part of this specification, illustrate one or more embodiments of the invention and, together with the description, serve to explain the principles of the disclosure herein.

BRIEF DESCRIPTION OF THE DRAWINGS

The disclosure herein refers to the accompanying drawings, in which some, but not all, embodiments of the disclosure are shown. Indeed, the subject matter of this disclosure may be embodied in many different forms and should not be construed as limited to the embodiments set forth herein.

FIG. 11 is an exploded view of a slider frame as shown in FIG. 10;

FIG. 12 is a perspective assembled view of the slider frame as in FIG. 11;

FIG. 16 is an exploded view of a door panel as in FIG. 10;

FIG. 17 is a perspective, assembled view of the door panel as in FIG. 10;

Figure 1:
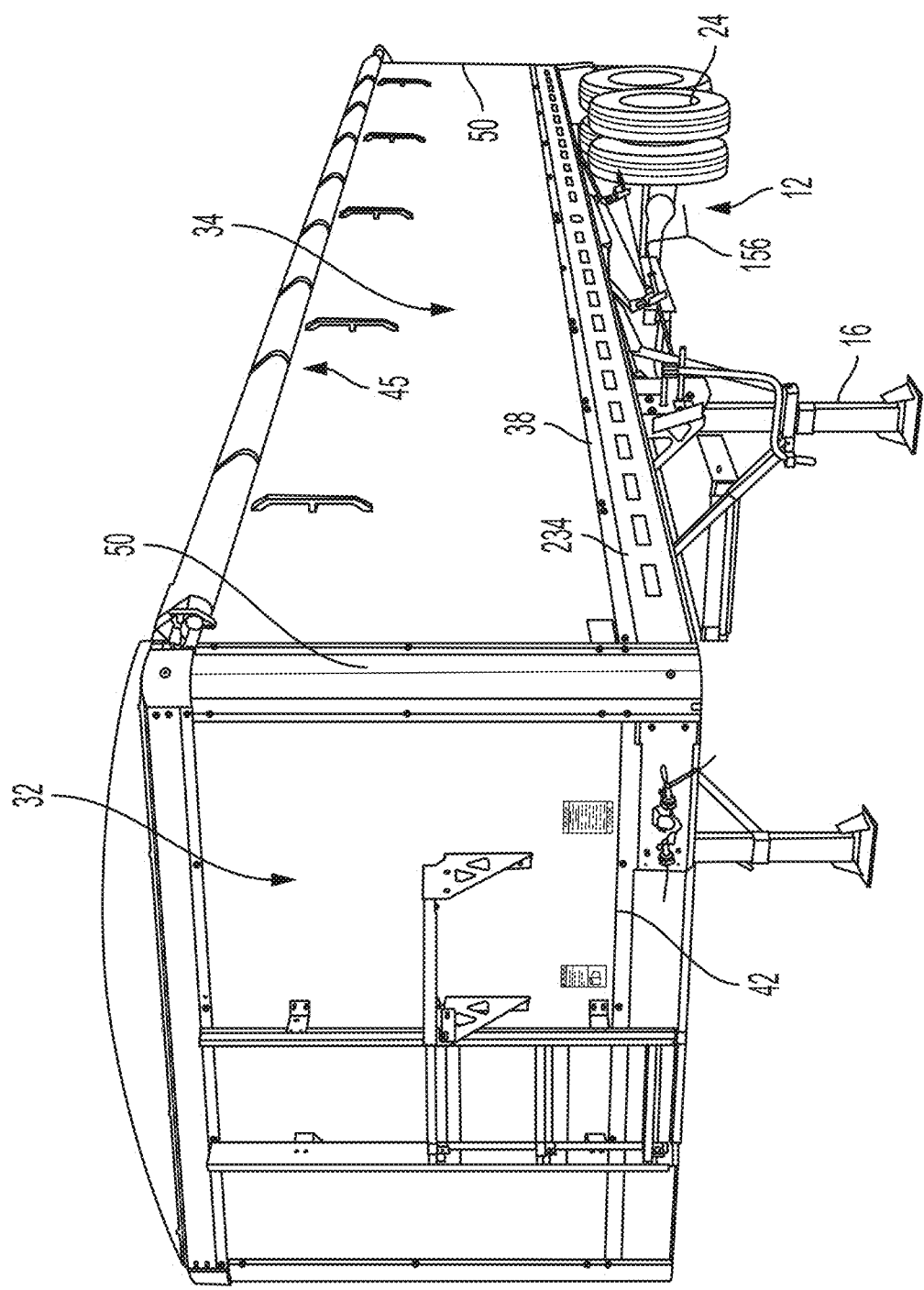
FIG. 1 is a perspective view of a grain trailer according to an embodiment of the present disclosure.
Figure 2:
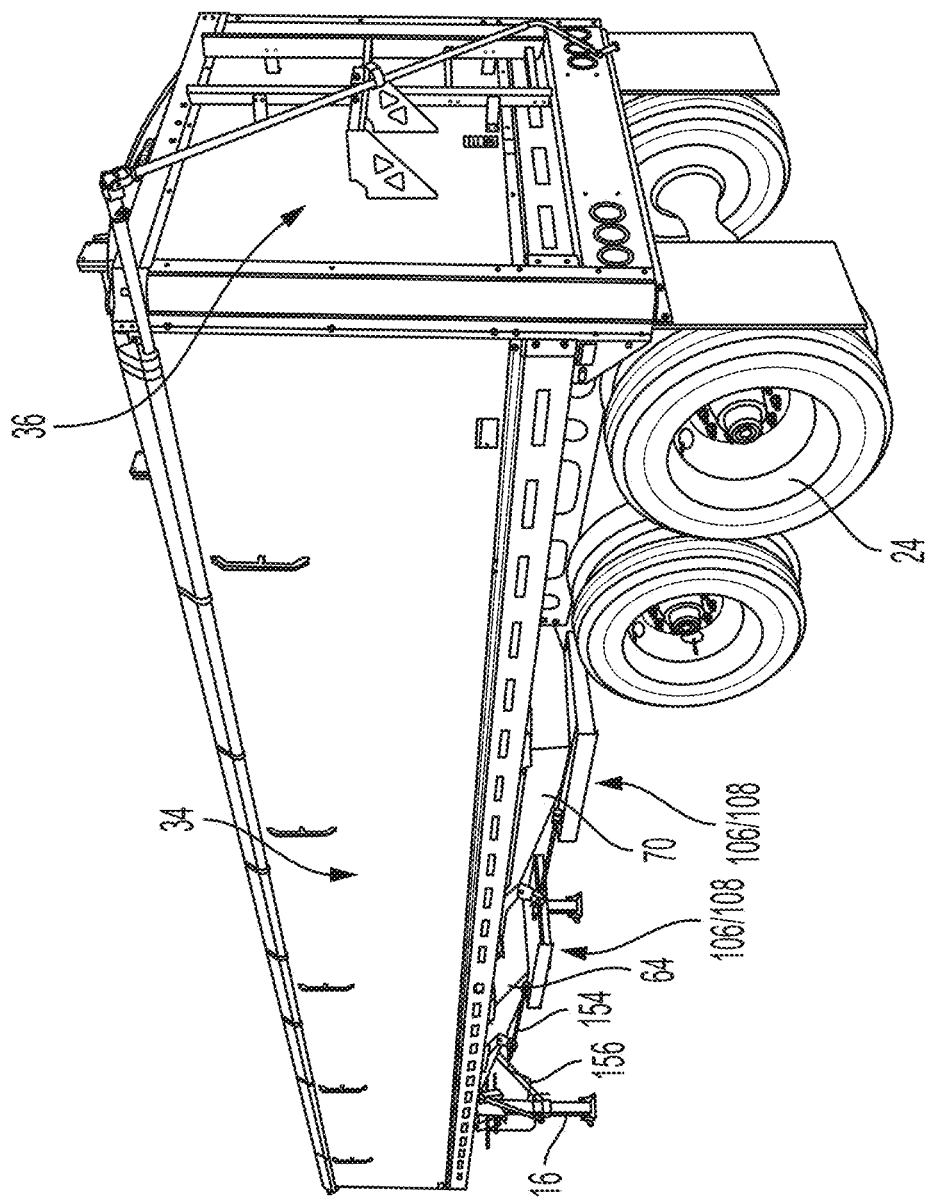
FIG. 2 is a perspective view of the grain trailer as in FIG. 1.
Figure 3:
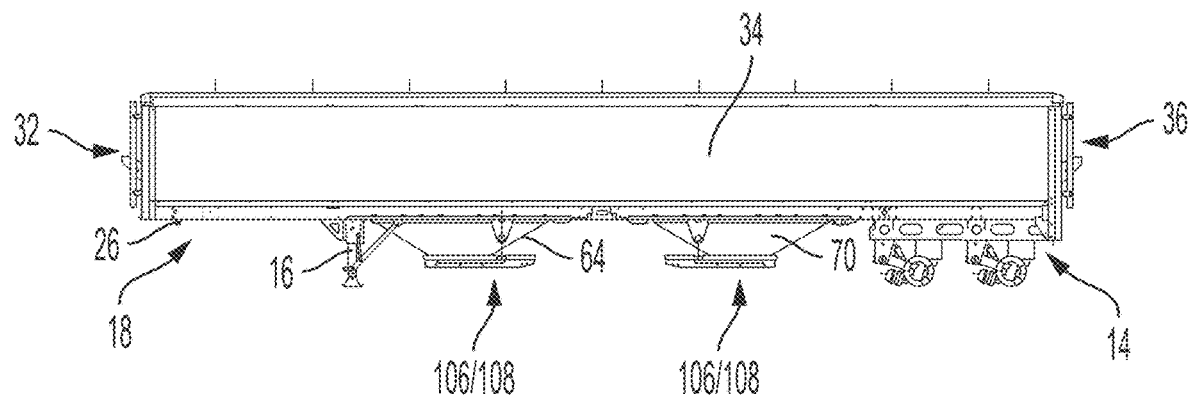
FIG. 3 is a partial plan view of the grain trailer as in FIG. 1.
Figure 4:
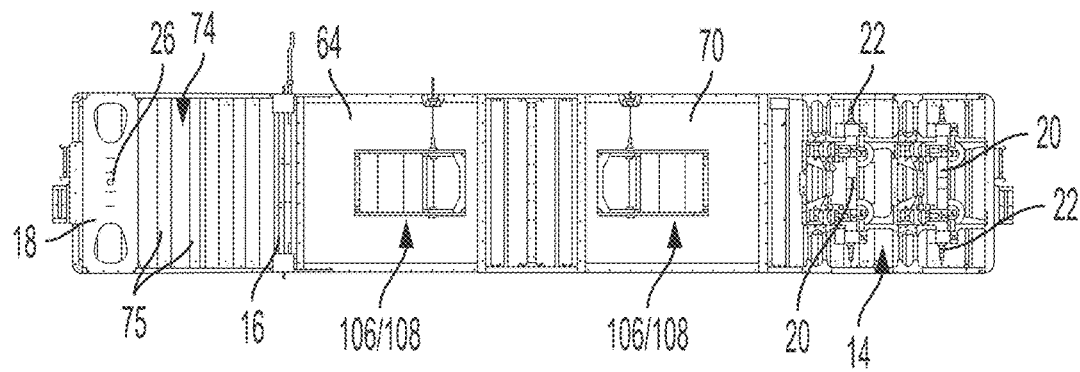
FIG. 4 is a partial bottom view of the grain trailer as in FIG. 1.
Figure 5:
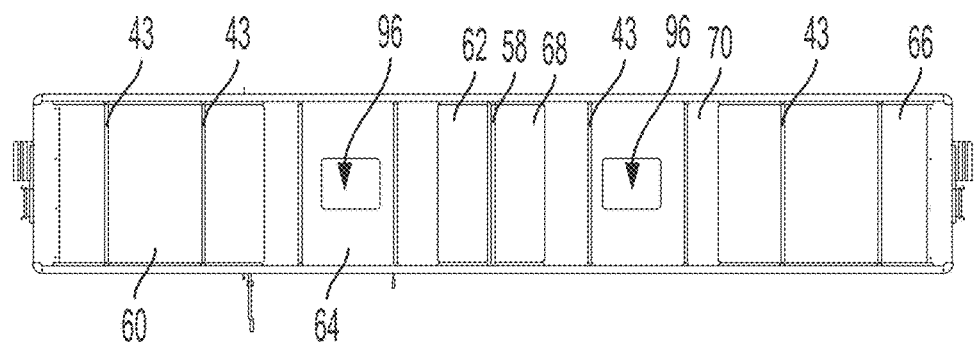
FIG. 5 is a partial top view of the grain trailer as in FIG. 1.

Repeat use of reference characters in the present specification and drawings is intended to represent same or analogous features or elements according to the disclosure.

DETAILED DESCRIPTION

Reference will now be made in detail to present embodiments of the disclosure, one or more examples of which are illustrated in the accompanying drawings. Each example is provided by way of explanation of the disclosure, not limitation of the disclosure. In fact, it will be apparent to those skilled in the art that modifications and variations can be made in the present disclosure without departing from the scope or spirit thereof. For instance, any number of features illustrated or described as part of one embodiment may be used on another embodiment, in any combination, to yield a still further embodiment. Thus, it is intended that the present disclosure covers such modifications and variations as come within the scope of the appended claims and their equivalents.

It should be understood that terms of orientation, e.g. "forward," "front," "rearward," "rear," "upper," "lower," and similar terms as used herein are intended to refer to relative orientation of components of the devices described herein with respect to each other under an assumption of consistent point of reference but do not require any specific orientation of the overall system. Thus, for example, the discussion herein may refer to a "forward" or "front" end of a semi-trailer, referring to a direction toward the end of the trailer that has the kingpin that is received by a fifth wheel at the "rearward" or "rear" end of a tractor, or a "rearward" end of the trailer, referring to a direction toward the trailer's rear, at which the rear wall is disposed and at which the bogie is attached. The present discussion may also refer to "upper" and/or "lower" surfaces of the trailer and/or its components, generally with regard to the trailer's orientation as shown in FIG. 1. Such terms may be used in the present disclosure and claims and will be understood to refer to a relative orientation but not to an orientation of the trailer with respect to an external frame of reference.

Further, either of the terms "or" and "one of _____ and _____," as used in this disclosure and/or the appended claims, is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an," as used in this application and the appended claims, should generally be construed to mean "one or more" unless specified otherwise or clear from the context to be directed to a singular form. Throughout the specification and claims, the following terms take at least the meanings explicitly associated with them herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrases "in one embodiment" or "in an embodiment," or similar phrase, as used herein do not necessarily refer to the same embodiment, although they may.

Figure 9:
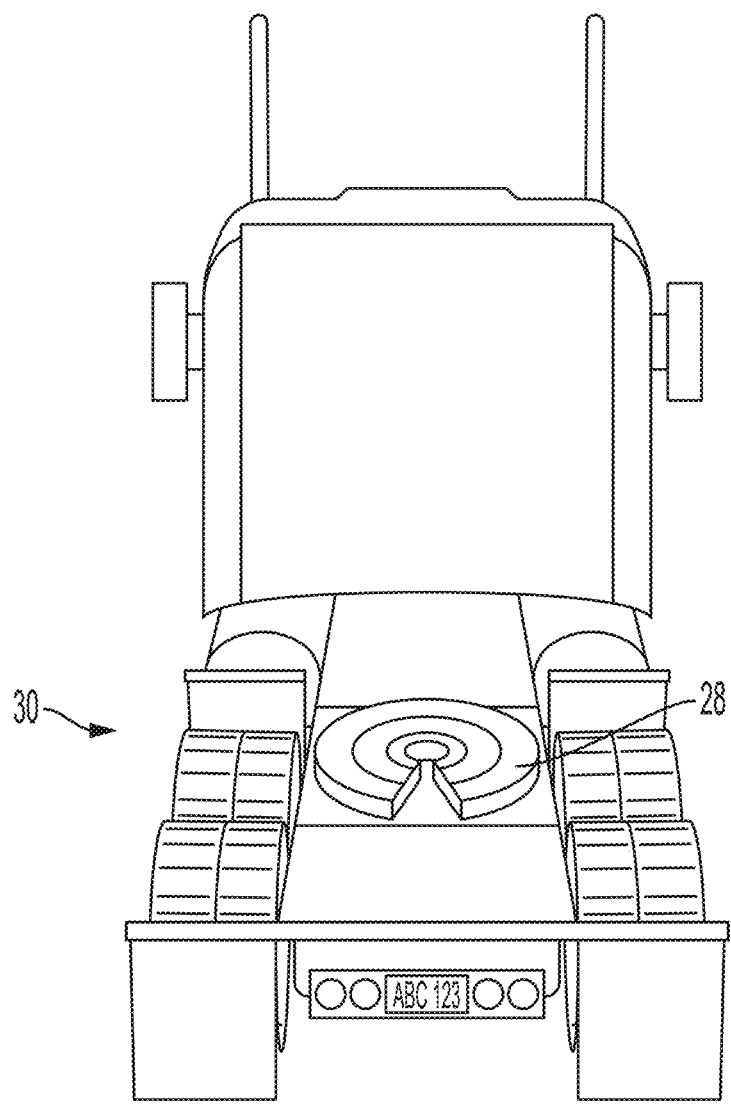
FIG. 9 is a rear perspective view of a tractor for use with the grain trailer as in FIG. 1.

Referring to FIGS. 1-8, a semi-trailer, for example for use in hauling grain, may include a wheeled chassis 12 comprised of an axle subframe 14, a pair of retractable legs 16, and a kingpin subframe 18. Axle subframe 14, sometimes described as a "bogie," may have a pair of tandem axles 20 with hubs 22 at each end thereof, each supporting two wheels 24. A kingpin 26 may extend downward from kingpin subframe 18 for engagement with a fifth wheel 28 of a tractor 30 (FIG. 9) to thereby operatively connect trailer 10 with tractor 30 so that, assuming retraction of retractable legs 16, tractor 30 may pull trailer 10.

Trailer 10 may include four vertical walls—a front wall 32, two opposing sidewalls 34, and a rear wall 36. A respective aluminum bottom rail 38 may be attached to and extend the entire length of each sidewall 34. A respective top rail 40 may be attached to and extend the entire length of the upper edge of each sidewall 34. Similarly, a bottom rail 42 may be attached to and extend along the entire bottom length of front wall 32, while a top rail 44 may be attached to and extend the entire length of the top edge of front wall 32. A bottom rail 46 may be attached to and extend the entire length of the bottom of rear wall 36, while a top rail 48 may be attached to and extend the entire length of rear wall 36. Corner posts 50 may be disposed vertically at each corner of the trailer. Each corner post may be attached to two trailer walls that meet at the respective corner posts orthogonally to each other. Each corner post may also be attached to and thereby connect a pair of orthogonally-aligned top rails and a pair of orthogonally-aligned bottom rails that respectively meet at the corner post. A tail gate light panel 52 may attach to rear bottom rail 46.

Kingpin subframe 18 may attach to front bottom rail 42 and to each of the two side bottom rails 38. Axle subframe 14 may attach to rear bottom rail 46 and the two side bottom rails 38.

Within the interior trailer volume defined by walls 32, 34 and 36, grain trailer 10 may define two sub-volumes 54 and 56 in which the trailer may store grain during transport. Front sub-volume 54 may be defined on its sides by the opposing sidewalls 34, at its rear by a center wall section 58, and otherwise by a cargo deck comprised of a forward sloped section 60, a forward center sloped section 62, and a forward hopper 64. Rear sub-volume 56 may also be defined on its sides by opposing sidewalls 34, at its front by center wall section 58, and otherwise by the cargo deck, specifically rear sloped section 66, rear center sloped section 68 and rear hopper 70. While the presently-described examples of a grain trailer illustrate front and rear walls 32 and 36 that are distinct and offset from the cargo deck, it should be understood that these distinct wall structures can be omitted and that in such trailers, the front and rear walls may be embodied by the structure of the sloped sections 60 and 66.

Forward sloped section 60 may be an upper, generally planar sheet glass-filled polypropylene sheet 72 and a bottom formed aluminum structure 74. Structure 74 may comprise a plurality of generally C-shaped or generally Z-shaped aluminum cross members 75 beneath the polypropylene top sheet and attached to side rails 78. An aluminum top flange 76 may be attached to the top and bottom sections 72 and 74 and to front wall top rail 44. A pair of aluminum side rails 78 may be attached to the upper and/or lower sections 72 and 74, attaching also at their upper ends to top rail 40 and at their lower ends to sidewall bottom rails 38. A pair of shims 80 may be disposed between side rails 78 and the inner surfaces of walls 34 to seal a gap between side rails 78 and sidewalls 34. Shims 80 may be formed by high molecular weight polyethylene and may be attached to the sidewalls by huck bolts or other suitable fasteners that extend into the sidewall at the sidewall's inner panel but do not protrude through the wall's outer panel. Rear sloped section 66 may have a similar structure to, and be the mirror image of, forward slopes section 60 and is, therefore, not further discussed herein.

Figure 6:
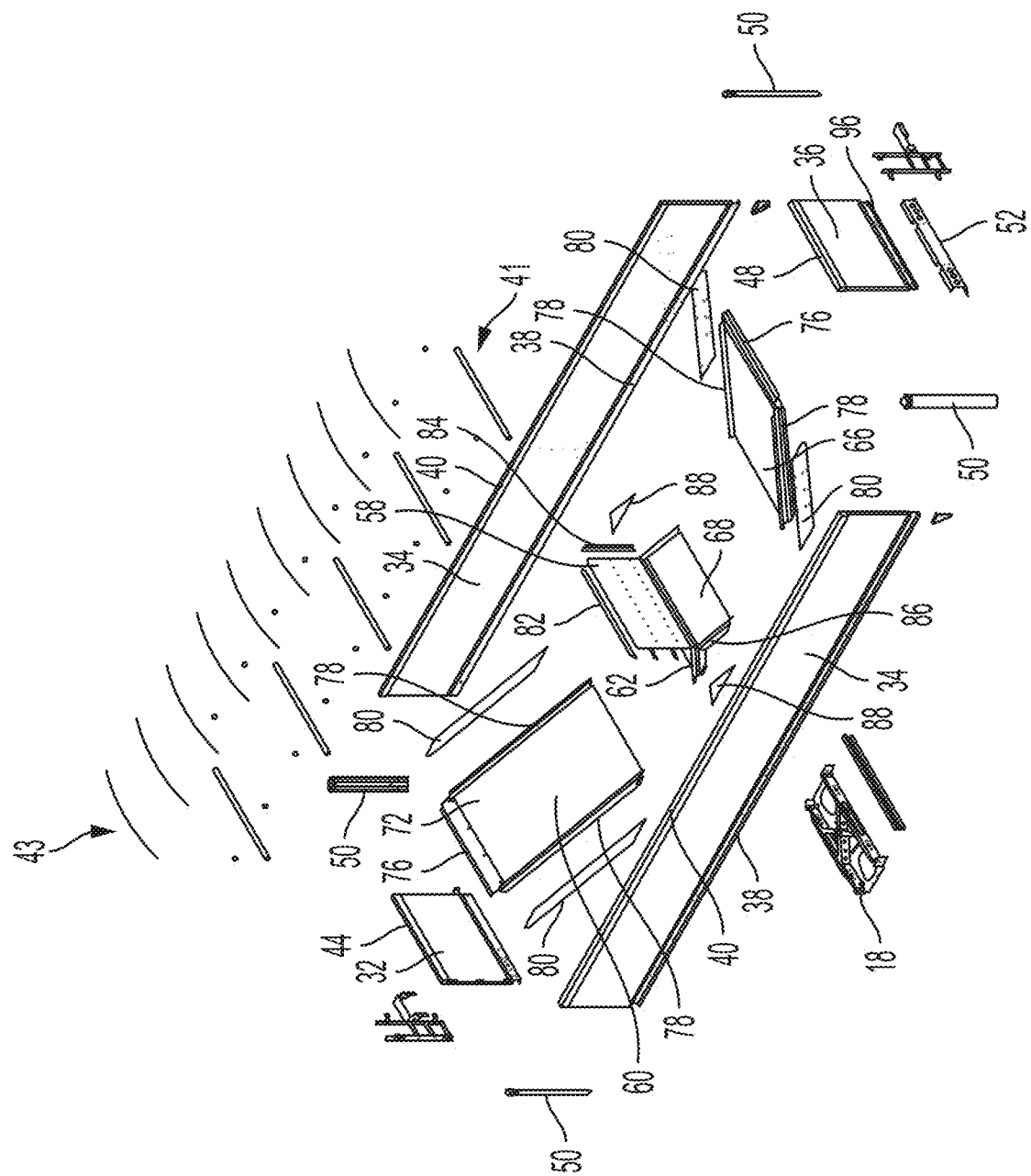
FIG. 6 is a partial exploded view of the grain trailer as in FIG. 1.
Figure 7:
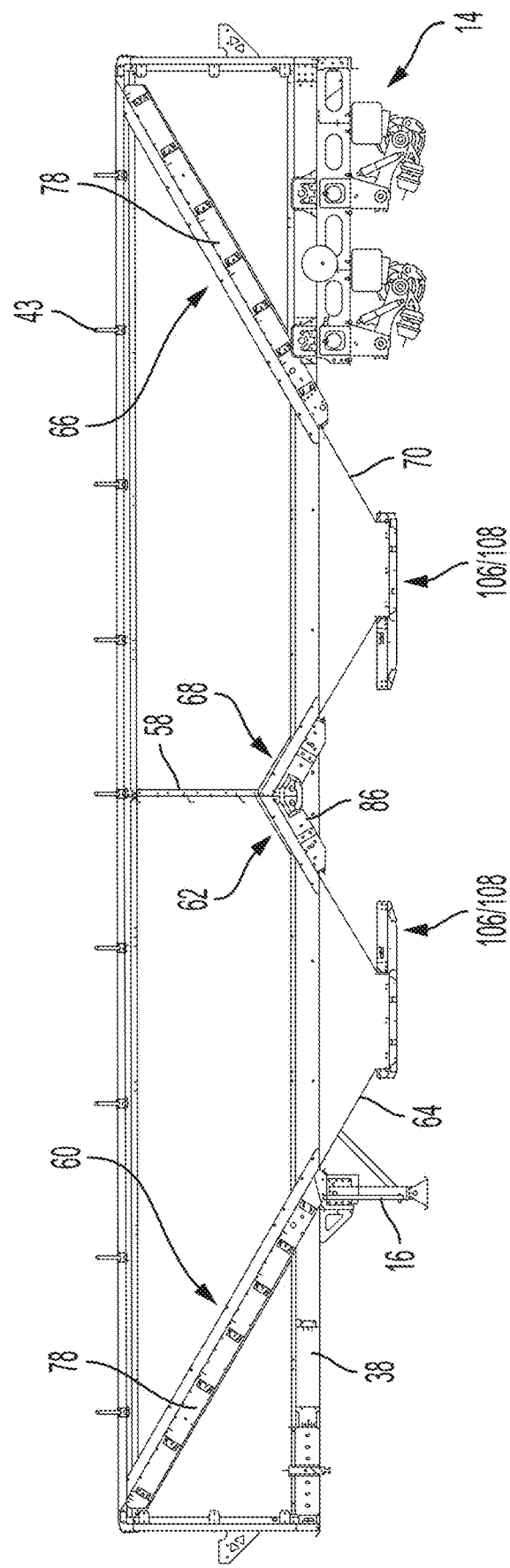
FIG. 7 is a partial plan view, in section, of the grain trailer as in FIG. 1.
Figure 8:
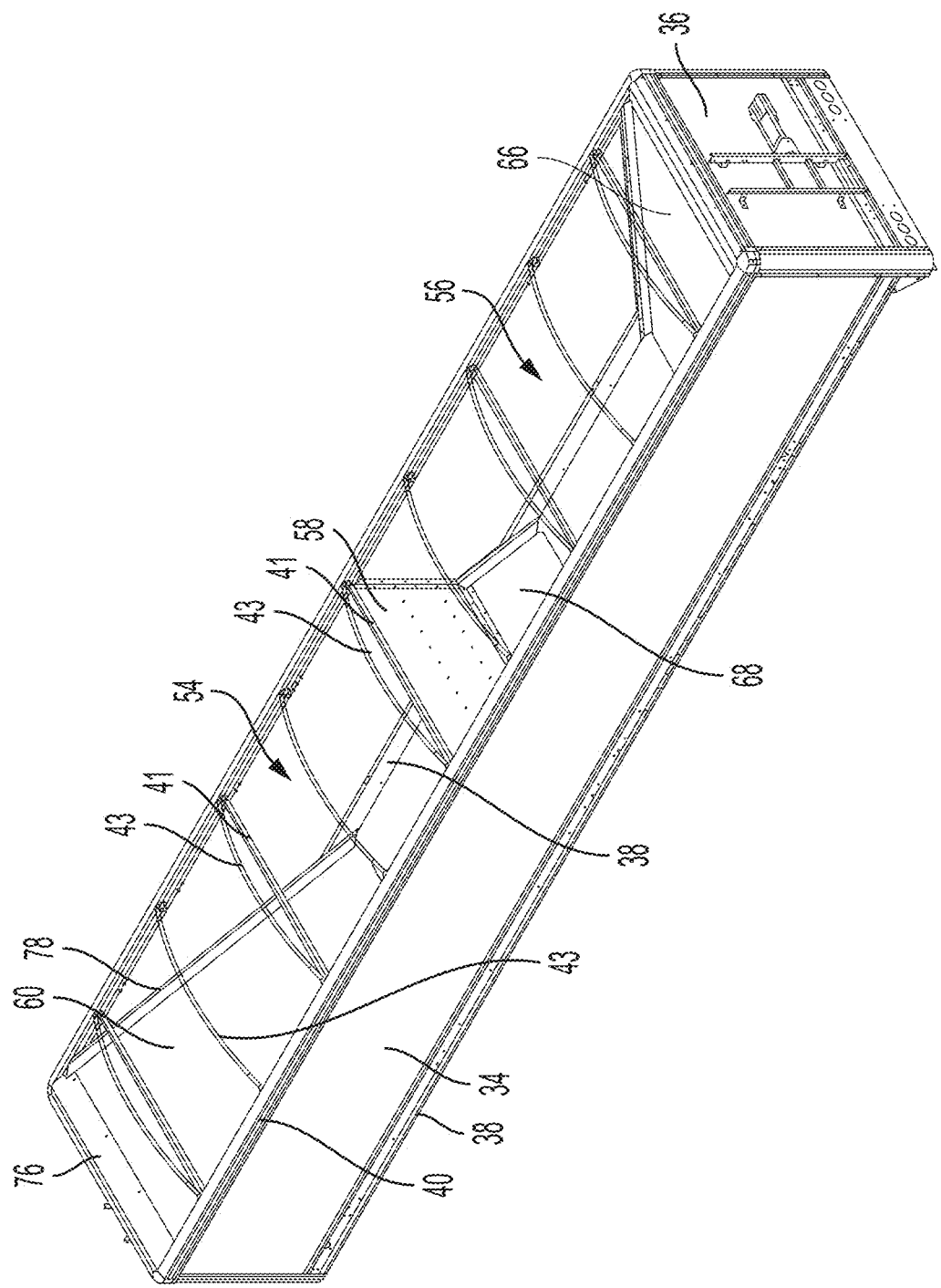
FIG. 8 is a partial top perspective view of the grain trailer as in FIG. 1.

A cap rail 82 may attach to the top of center wall section 58 to provide structure to the center wall and to attach the center wall to the top rails through an attachment to a top rail cross bar 41. The center wall may be formed from a glass-filled polypropylene, similar to the front and rear sloped sections 60 and 66. Center wall 58 may attach to the respective sidewalls 34 through opposing side strips 84 (only one of which is shown in FIG. 6). Each of forward and rear center sloped sections 62 and 68 may be formed of a generally planar glass-filled polypropylene sheet and a lower section comprising a plurality of formed aluminum ribs underneath to support the upper surface. The upper sheet and lower section may be attached to the center wall via screws or rivets and aluminum connecting strips. At the sides of each center sloped section, respective V-shaped siderails 86 may be attached thereto. Side rails 86 may attach, for example by rivets or screws, to respective bottom rails 38 through shims 88.

A plurality of spaced apart top rail support bars 41 may attach to the top rails 40 of opposing sidewalls 34 so that the top rail support bars extend across the open top of the trailer body and provide rigidity support to the walls. Also attached to the top rails and extending across the open top may be a plurality of tarp bows 43. Five of the nine tarp bows may attach to the top rails at the same positions as respective ones of the five top rail support bars 41 so that the five tarp bows extend directly above the respective top rail support bars. The tarp bows support a retractable tarp 45 (seen in its retracted, rolled up state on one side of the trailer in FIG. 1). When the tarp is unrolled and extended over the top of the trailer, it may be supported by the tarp bows to provide a roof structure. With the tarp retracted, the spacings between the tarp bows and between the top rail support bars may allow an input chute to pour grain into the two cargo sub-volumes.

Figure 10:
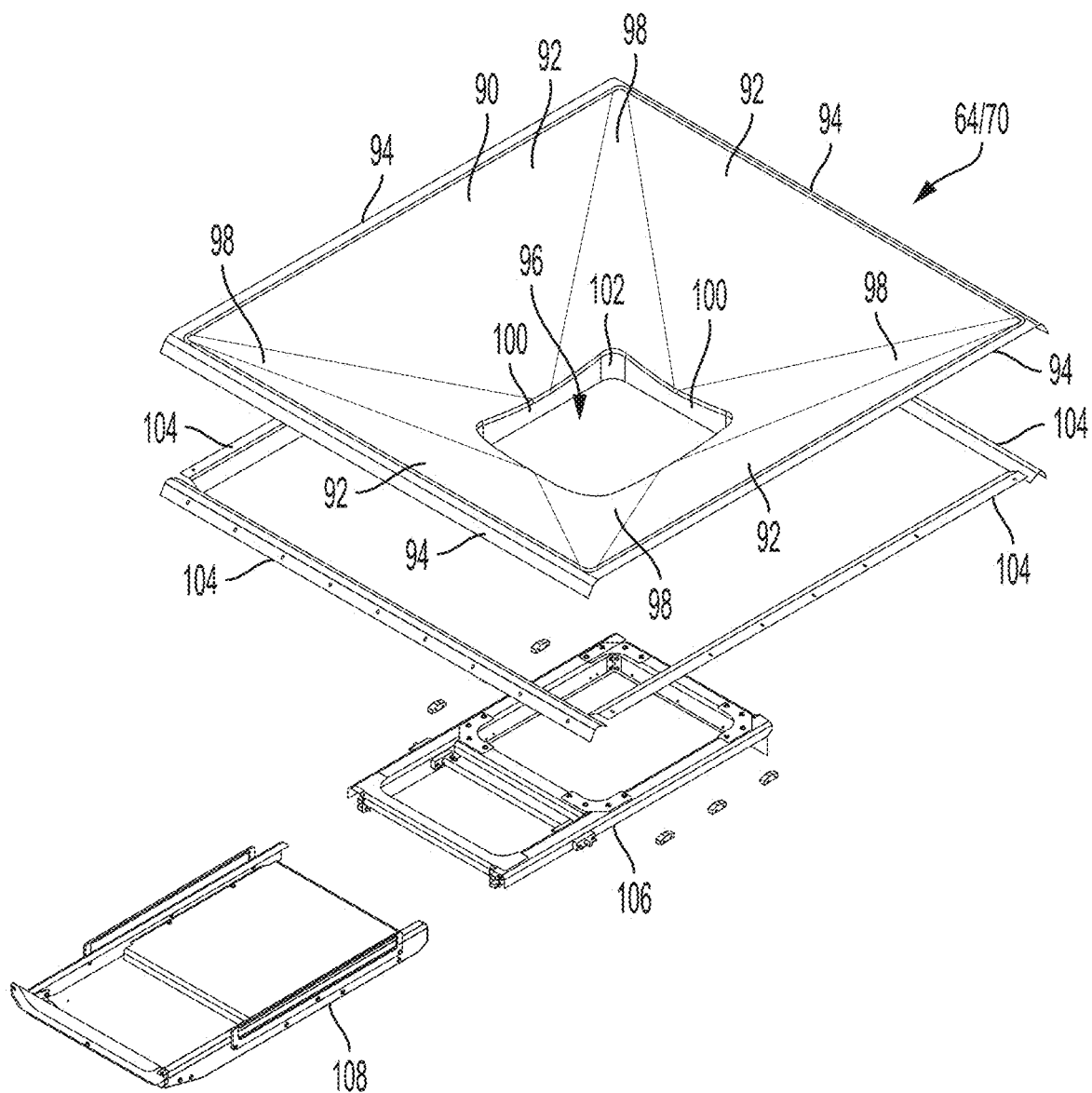
FIG. 10 is an exploded view of a hopper and door assembly for use with the grain trailer as in FIG. 1.

Referring to FIG. 10, and also to FIGS. 3-5, 7, and 8, each of hoppers 64 and 70 may comprise a funnel-shaped unitary piece 90 of rotationally molded high density polyethylene or other suitable polymer, e.g. medium density polyethylene, linear low density polyethylene, or cross-link polyethylene, that may be defined by four generally planar triangular-shaped sections 92 extending downward from the rectangular arrangement of upper edges 94 to respective points at the sides of a correspondingly rectangular opening 96 at the funnel's bottom. A respective generally triangular, but curved, corner section 98 may extend between each adjacent pair of triangular sections 92 and bound a respective corner of opening 96. Also bounding hole 96, the hopper may include four downwardly-extending flanges 100 connected by curved corners 101. Flanges 100 may extend downward and into the inside of a perimeter frame defined by a slider frame 106 that receives a door panel 108 that moves with respect to slider frame 106, as discussed below.

Upper funnel edges 94 may bend away and downward from their respective triangle-shaped sections 92 to thereby provide attachment surfaces for angled aluminum support brackets 104. One flange of each bracket 104 may attach to a respective funnel edge 94, while the other side of flange 104 may attach to a corresponding bottom rail 38, top surface 72 of a sloped section 60/66, or a top surface of a center sloped section 62 or 68, thereby securing the hoppers to the trailer body so that they form a part of the cargo deck.

Where each hopper funnel 90 is made of a unitary piece of a molded polymer material so that the funnel is not formed in discrete sections joined together by weldment or other fasteners, the funnel may therefore have no joints, seams, or fastener heads at the surface of the funnel that holds grain. This may be true even at the creases defined between the various sections of the funnel described herein. As a result, the funnel may not define, or minimize, structure on the funnel's grain-holding surface that could become places of attachment for grain particles. This may facilitate both the flow of grain through the funnel and cleaning of the funnel.

Referring to FIGS. 10, 11, and 12, again with reference to FIGS. 3-5, 7, and 8, hopper door slider frame 106 may include a center frame that attaches to and surrounds flanges 100 of funnel 90 and that is attached thereto by suitable attachment mechanisms, such as bolts or screws that pass through the flanges and the slider frame's center frame. The center frame may be comprised of four linear frame members 110, 112, 114, and 116. Each frame member may have an elongated, generally planar, vertical portion that seats against an outer surface of a corresponding funnel opening flange 100, a top flange that extends ninety degrees horizontally from the main vertical portion, and an outer vertical flange that extends downward from the horizontal top flange (on the side of the top flange opposite the main vertical portion) parallel to the main vertical portion, thereby strengthening the frame member. Angle brackets 118 may abut adjacent linear frame members 110/116, 116/114, 112/114, and 112/110, and rivets, screws or bolts may extend through the angle brackets to attach the frame members to each other through the brackets. Also securing and strengthening the center frame, four corner brackets 120 may attach to adjacent top flanges of the frame members.

On each of the four sides of the center frame, an aluminum bracket 122 may attach to the outer surface of the main vertical portion of respective linear frame members 110, 112, 114, and 116. Attached to each aluminum brush bracket may be a brush 124 having downwardly-extending nylon bristles. The bristles may engage the edges of a door section of door panel 108 and inhibit the escape of grain between the upper door surface and the lower edges of funnel flanges 100. A mud flap 126 may attach to an outer downward-extending flange 128 of forward linear frame member 112 to inhibit fouling of the door mechanism, and of the intersection of the door and the funnel opening, from dirt and debris brought up from the roadway as the trailer moves in the forward direction.

Side linear frame members 110 and 114 may extend rearward beyond rear linear frame member 116. Aft of rear linear frame member 116, a hollow shaft 130 may extend between frame members 110 and 114 to abut bushings 132 and 134 that are fixed to the inner surfaces of rails 114 and 110, respectively. Each bushing may have a central through-bore through which extends a freely rotatable short shaft 136 and 138, respectively. Each short shaft 136 and 138 may be rotationally fixed to hollow shaft 130 by a respective pin 140 that extends through the ends of both the short shaft and the hollow shaft, where the short shaft is received within the open end of the hollow shaft. Short shafts 136 and 138 may extend through holes in the main vertical portions and the outer vertical flanges 146 and 148 of frame members 114 and 110 and then through holes of respective outer bushings 142 and 144 that are fixed to frame members 114 and 110, respectively). Each short shaft may be rotationally fixed to a pinion gear (not shown in FIG. 11) that is disposed on the short shaft between the main vertical portion and the outer vertical flange 146 or 148 of linear frame member 114 or 110, as the case may be. For example, the short shaft may be formed integrally with the machined/hobbed pinion gear.

Figure 13:
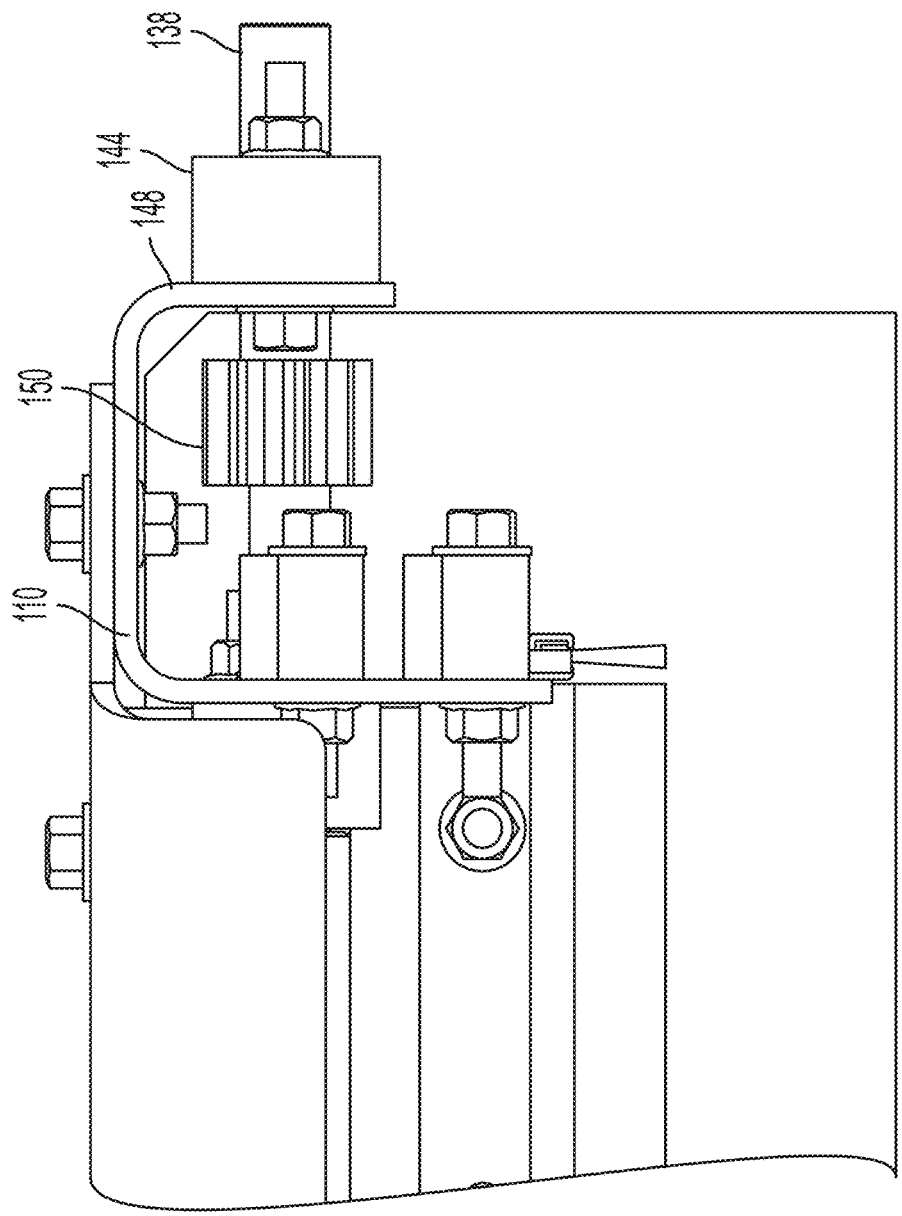
FIG. 13 is a partial plan view of the slider frame as in FIG. 10.
Figure 14:
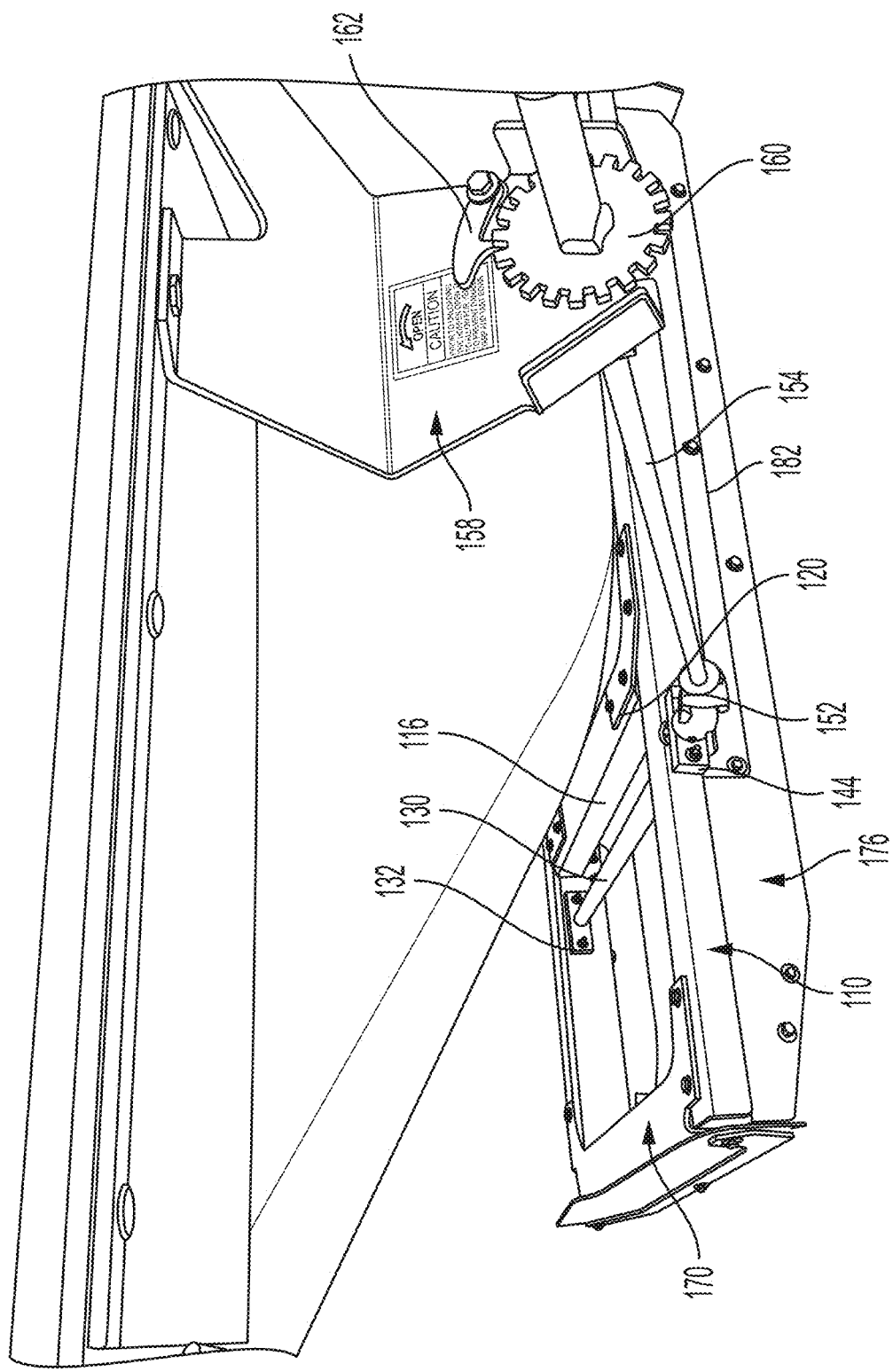
FIG. 14 is a partial perspective view of the hopper and door assembly of FIG. 10.
Figure 15:
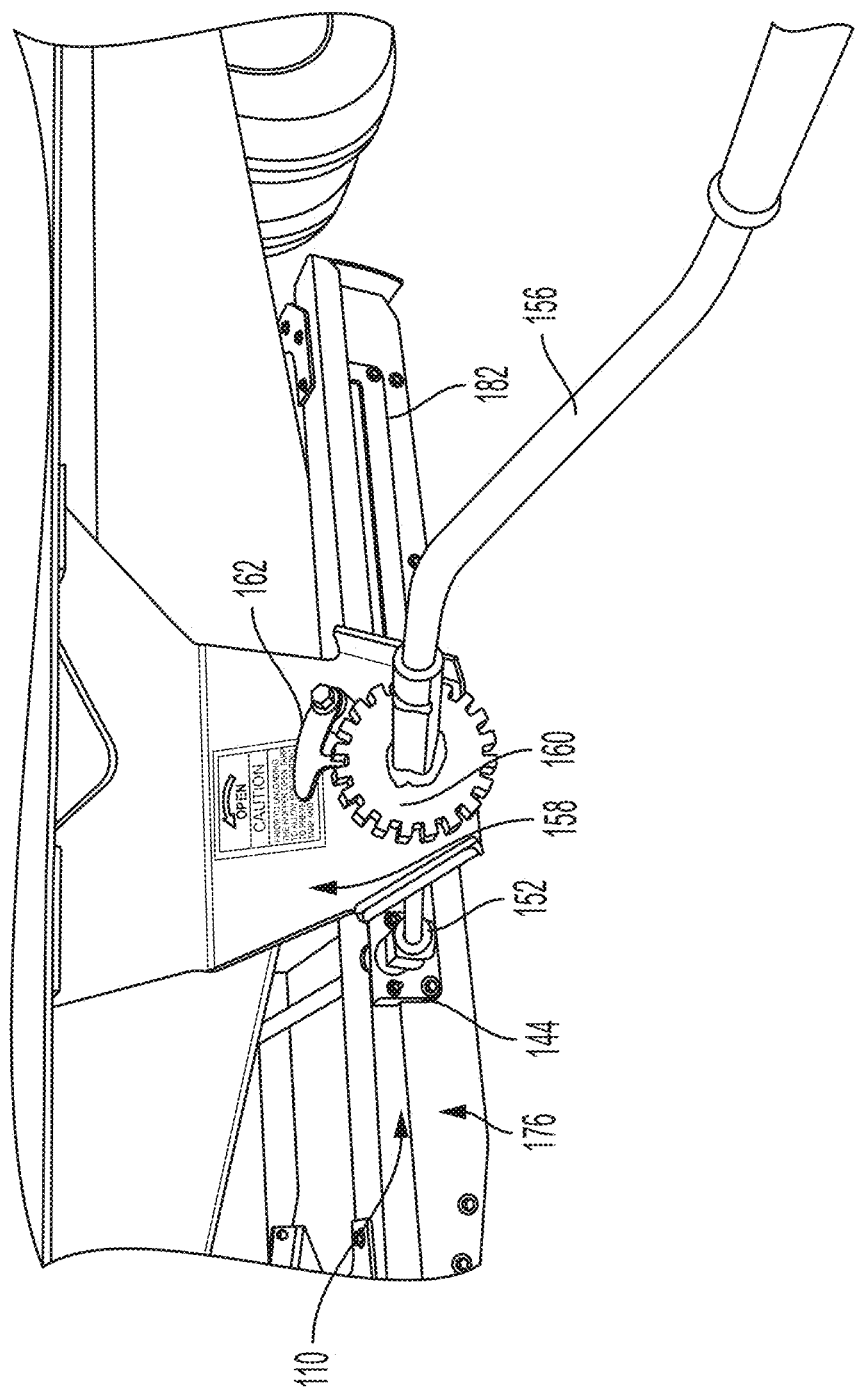
FIG. 15 is a partial side view of the hopper and door assembly of FIG. 10.

FIG. 13 illustrates an example positioning of a pinion gear 150 on a short shaft 138 within the confines of linear frame member 110, as described above. A similar pinion gear, in a mirror-image arrangement, may be disposed on short shaft 136 within the confines of linear frame member 114. Referring also to FIG. 14, the outer end of short shaft 138 may be fixed, e.g. by a splined and/or pinned engagement, to one operative end of a universal joint 152. The other end of the universal joint may be rotationally fixed to a hand crank shaft 154. Because the universal joint may rotationally fix the hand crank to short shaft 138, which may be, in turn, rotationally fixed to hollow shaft 130, the other short shaft (136), and the two gears 150 as described above, rotation of hand crank 156 may simultaneously rotate the two gears 150. Shaft 154 may extend through a bracket 158 attached to a side bottom rail 38 (FIG. 6) and into a keyed opening of handle 156. A sprocket 160 may be rotationally fixed to handle 156. A Pawl 162 may be pivotally attached to bracket 158 so that engagement of the pawl tooth into the teeth of sprocket 160 locks the rotationally position of the gears thereby, as evident from the discussion herein, locking door panel 108 (FIG. 10) in its position with respect to the slider frame.

Referring again to FIGS. 11 and 12, a pair of upper and lower slider blocks 164 and 166 may be attached to the main vertical portion of side rail 110 between the main vertical portion and outer vertical flange 148 at the rearward end of the linear frame member. A mirror-image arrangement of slider blocks 164 and 166 may be provided at a comparable position on rail 114. A gap may be provided between blocks 164 and 166 that is sufficient to receive a flange of door panel 108 (FIG. 10), as described below, to thereby stabilize the door panel's position with respect to the slider frame and to inhibit pivoting movement of the door panel with respect to the slider frame by inhibiting pivotal movement of the door panel with respect to the slider frame about gears 150 (FIG. 13). A similar slider block 168 may be attached to the main vertical portion of linear frame member 110, again at the main vertical portion of the frame member and outward vertical flange 148, slightly forward of gear 150 (FIG. 13). Slider block 168 may provide a lower stop to prevent downward rotation of door panel 108 (FIG. 10) about the gear. A similar, mirror-image arrangement of a lower slider block 168 is provided on linear frame member 114. A door frame cross member 170 may attach to the tops of, and connect, the ends of linear frame members 110 and 114.

Referring to FIGS. 16 and 17, and with reference to FIG. 10, hopper door panel 108 may include a generally planar aluminum door plate 172. Door plate 172 may be generally rectangular in shape and include down-turned flanges 171 extending from each linear edge of the plate's main planar portion. Two side rails 174 and 176 may include generally planar vertical main sections that abut and attach (e.g. by rivets, screws, or other suitable fastening mechanisms) to the two side downward-turned flanges 171 on opposite sides of door plate 172. The bottom edges of side rails 174 and 176 may be approximately flush with the bottom edges of the side flanges 171. The main vertical portions of rails 174 and 176, however, may be taller than are the side flanges 171, with the result that horizontally-turned top flanges 178 and 180 at the tops of the main vertical portions of rails 174 and 176 are spaced apart from and above the generally planar surface of door plate 172, as seen in FIG. 17. A pair of toothed rack brackets 182 and 184 may be generally rectangular in shape, e.g. as shown in FIG. 16, each with a respective open slot 186 and 188 extending therethrough and extending the majority of the length of door plate 172. Each bracket may be attached to the main vertical portion of a corresponding side rail 174 and 176 so that the bottom of each bracket's open slot 186 or 188 is approximately flush with rail top flanges 178 and 180. Thus, slots 186 and 188 may extend above top flanges 180 and 178. As discussed below, slots 186 and 188 may receive respective gears 150 (FIG. 13). Because the gears, in these examples, are disposed aft of the central frame opening defined by linear frame members 110, 112, 114, and 116 of slider frame 106 (FIG. 11), brackets 182 and 184 are shifted aft with respect to door plate 172 by a corresponding distance. Top bars 190 and 192 of brackets 184 and 182 may define the upper boundaries of slots 188 and 186, respectively. The lower edge of each of bars 190 and 192, i.e. the surface facing downward toward slots 188 and 186, may define respective toothed rack surfaces 194 and 196 that extend the entire length of slots 188 and 186 and that engage the teeth of a respective gear 150 (FIG. 13). An aluminum brace 198 may be attached to and extend across the front ends of rails 174 and 176. A mud flap 200 may be disposed between brace 198 and the fronts of rails 174 and 176. Aluminum bars 202 may be fixedly mounted flush against the underside of door plate 172 to provide structural support to the door plate. Bars 202 may be tubes with forty-five degree angled ends, bolted at those ends to door plate 172.

In operation, and referring to FIGS. 10-17, side rails 174 and 176 of door panel 108 extend upward to the bottom edges of outer flanges 146 and 148 of linear frame members 114 and 110, respectively, so that horizontally-turned top flanges 178 and 180 extend to and are received between respective pairs of upper and lower slider blocks 164/166 on linear frame members 114 and 110 and upon the upper surfaces of respective slider blocks 168 on linear frame members 114 and 110. Furthermore, gears 150 (FIG. 13) may extend into respective slots 188 and 186 of the toothed rack brackets 184 and 182 that extend upward from flanges 178 and 180 into the volume between the main vertical portions of linear frame members 114 and 110 and vertical flanges 146 and 148, as indicated in FIG. 14. The teeth of each of the two pinion gears 150 may operatively engage the downward-facing teeth 194 and 196 of brackets 184 and 182, respectively. Thus, the operator's rotation of handle 156, thereby causing the rotation of pinion gears 150, may actuate the linear actuator formed by the pinion gears and the racks to thereby move the door plate horizontally with respect to opening 96 in the hopper funnel as framed by slider frame 106. The door can move between two positions, one in which door plate 172 is positioned in slider frame 106 so that the door plate completely blocks opening 96, and an opposite position in which the door plate is moved completely away from opening 96 so that opening 96 communicates its cargo sub-volume with the space beneath the trailer and allows the sub-volume's contents of grain to flow through hole 96 into that space. As is apparent from the Figures, the linear actuator's position above door plate 172 means that the linear actuator is not disposed below the door, where it could be to a greater degree exposed to damage during the trailer's operation.

Figure 18:
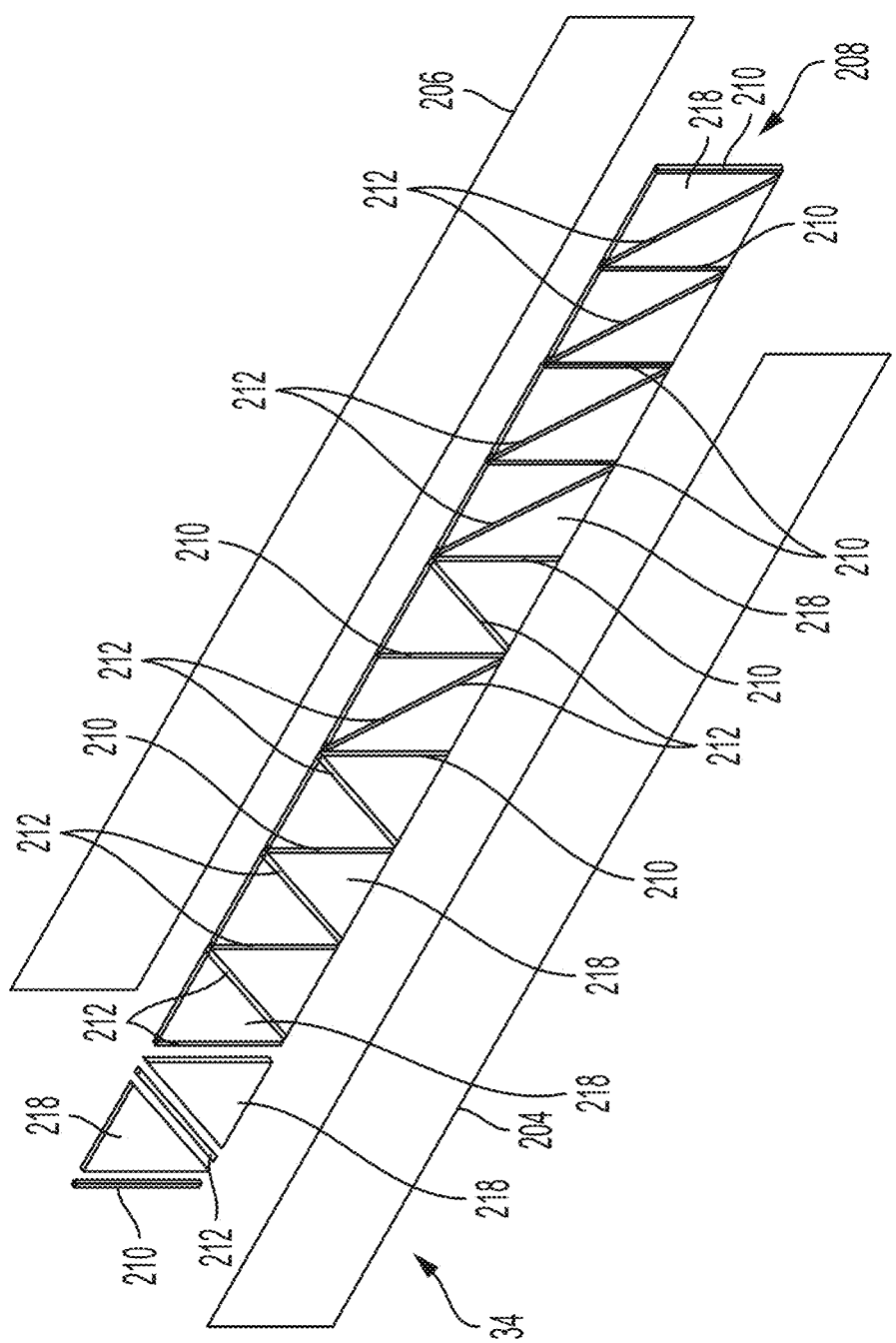
FIG. 18 is an exploded view of a sidewall as shown in FIGS. 1 and 6.

Referring to FIG. 18, and with reference to FIG. 6, each of the two opposing sidewalls 34 may be comprised of an inner polypropylene panel 204 and an outer polypropylene panel 206. Each panel 204 and 206 may be continuous, in that each is formed of a single, continuous piece of polypropylene, undivided into discrete sections. Each polypropylene sheet may be formed of a glass filled polypropylene having glass fibers aligned in layers that are disposed in alternatingly ninety degree offset orientations with respect to adjacent layers or plies within the sheet, and including ultraviolet resistance, e.g. as sold by Impact Guard LLC of Leetsdale, PA under the IG SERIES identifier. Such material may also be used for other polypropylene sheets as discussed herein. It will be understood in view of the present disclosure that other suitable materials, for example including fiberglass materials sold under the GOLD and FILON identifiers by Crane Composites, Inc. of Channahon, IL, or sold under the identifier LAMILUX 1000 by Lamilux Heinrich Strunz Holding GmbH Co. KG of Rehau, Germany, or under the "80" identifier by Ridge Corporation of Pataskala, OH, may be used with or instead of the IG SERIES material.

Figure 19:
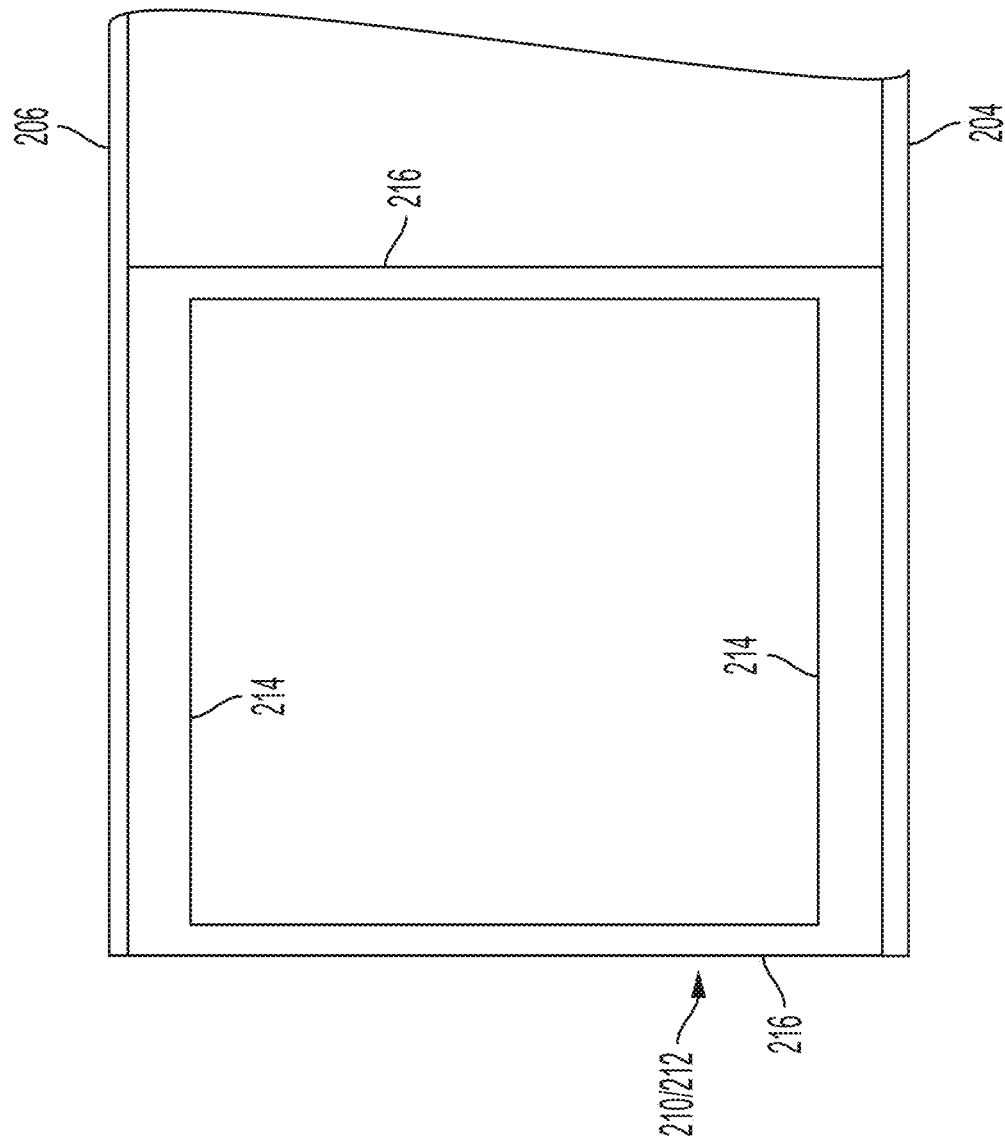
FIG. 19 is a section view of an aluminum panel bar and sidewall panels as shown in FIG. 18.

A center panel 208 may be comprised of a plurality of elongated vertically-oriented hollow aluminum tubes 210 and a plurality of elongated, hollow tubes 212 that extend between top and bottom ends of adjacent vertical tubes at an acute angle with respect to horizontal. Each tube 210 and 212 may be formed of 6061-T6 or other suitable grade of aluminum and may be generally rectangular in cross-sectional shape, considered in a plane normal to the tube's elongation axis. FIG. 19 illustrates an example of such a generally rectangular cross-section of each tube 210 or 212, where each tube has a hollow center and where the two sides 214 that face and abut panels 204 (approximately 0.05 inches thick) and 206 (approximately 0.05 inches thick) are thicker (approximately 0.18 inches) than sides 216 (approximately 0.09 inches) that face the interior of panel 208. The thickness of the bars, in the direction between panels 204 and 206, may be approximately 2.2 inches.

At the top of each bar 210 and 212, the bar may be attached to the top rail 40 to which the sidewall 34 is attached, by a huck bolt that passes through and three panels 204, 206, and 208. Similarly, at the bottom of each aluminum bar 210 and 212, the bar may attach to the bottom rail 38 of the corresponding sidewall 34 by respective huck bolts (or other suitable fasteners, such as bolt/nut systems) that pass entirely through the sidewall and the bottom rail.

Between each adjacent pair of vertical and horizontal aluminum bars 210 and 212 may be disposed a triangularly-shaped composite sub-panel 218. Each sub-panel 218 may be a polypropylene honeycomb composite with an internal cell structure comprised of polypropylene tubes laminated between two layers of polyester nonwoven scrim with an adhesive layer between each scrim layer and the polypropylene tube honeycomb core. The tubes may be at a density of three to four pounds per cubic foot, with a laminated thickness of approximately 2.2 inches. The material density may be approximately four pounds per cubic foot. The horizontal edge of each triangular sub-panel may be approximately forty-eight inches, with a vertical edge of approximately fifty-four inches. Thus, the vertical aluminum bars 210 may be approximately fifty-four inches in length, whereas angled tubes 212 may be approximately seventy-two and one-quarter inches in length. It will be understood, however, that such dimensions may vary with variations in trailer configuration, particularly with respect to trailer height. A honeycomb composite as described herein can be obtained from Plascore, Inc. of Zealand, Michigan. It will be understood, in view of the present disclosure, that other structures, e.g. foams, may be used for the sub-panels instead of the composite honeycomb structure discussed herein.

The ends of the angled bars 212 attach at the attachment positions of adjacent vertical bars 210 to the top and bottom rails, so that the arrangement of bars 210 and 212 forms a truss that provides strength to the sidewall that maintains the wall's rigidity when the trailer is loaded with grain. Aluminum bars 210 and 212 may provide the majority of the strength of sidewall 34 in the outward direction, when the cargo sub-volumes are full of grain. The triangularly-shaped sub-panels, however, may support polypropylene inner and outer panels 204 and 206 to resist the outwardly-directed forces of the load. In that regard, the sub-panels demonstrate advantageous compressive strength but do so at a relatively low weight over the trailer's length. That is, the sub-panels have an advantageous compressive force-to-weight ratio.

Each panel 204 and 206 may be attached to center panel 208 by an adhesive that is applied across the length of the sidewall and from top to bottom, thereby avoiding the need for rivets, bolts or other fasteners that would otherwise extend through the outer (with respect to center panel 208) surfaces of panels 204 and 206. This results in smooth and continuous (where the panels 204 and 206 are each made as a single, unitary piece) inner and outer surfaces of the trailer wall at inner panel 204 and outer panel 206. In some embodiments, the absence of protruding fasteners exists entirely from the sidewall bottom rail to the sidewall top rail and entirely between vertical corner post 50 (FIG. 6). In other embodiments, a smaller area of each panel surface is without protruding fasteners, for example up to one quarter, one half, or three quarters of the height of each inner and outer surface of the sidewall and up to one quarter, one half or three quarters of the width of each inner and outer surface of the sidewall. The one piece, continuous construction of each panel 204 and 206 may result in a smooth surface extending over the entirety of the sidewall inner and outer panels facing into the cargo area and the trailer's exterior from the bottom rail to the top rail and from front corner post to rear corner post. This may facilitate cleaning of the inner and outer surfaces of sidewall 34 in that the absence of protruding fasteners may minimize the surface at which grain particles may become wedged. The continuous, smooth outer surface of the single-piece outer panel 206 may also facilitate the application of paint or wrapping material to provide a desired aesthetic feature to the trailer. It will be appreciated that the surfaces of panels 204 and 206 may have a certain degree of roughness to the touch (e.g. because of an embossed surface) but that such surfaces are considered smooth within the meaning of the present disclosure because they do not exhibit surface variation at the level of rivet or other fastener head protrusions or inter-panel seams. An adhesive suitable for attachment of panels 204 and 206 to central panel 208 is provided under the identifier SOLFRE 3106 by Chemique Adhesives, Inc. of Kennesaw, Georgia. This adhesive is a two-component polyurethane adhesive, though it should be understood that other adhesives may be used, e.g. one-part, other two-part, or hot melt adhesives, or other polymer adhesives or spray-on adhesives.

Figure 21:
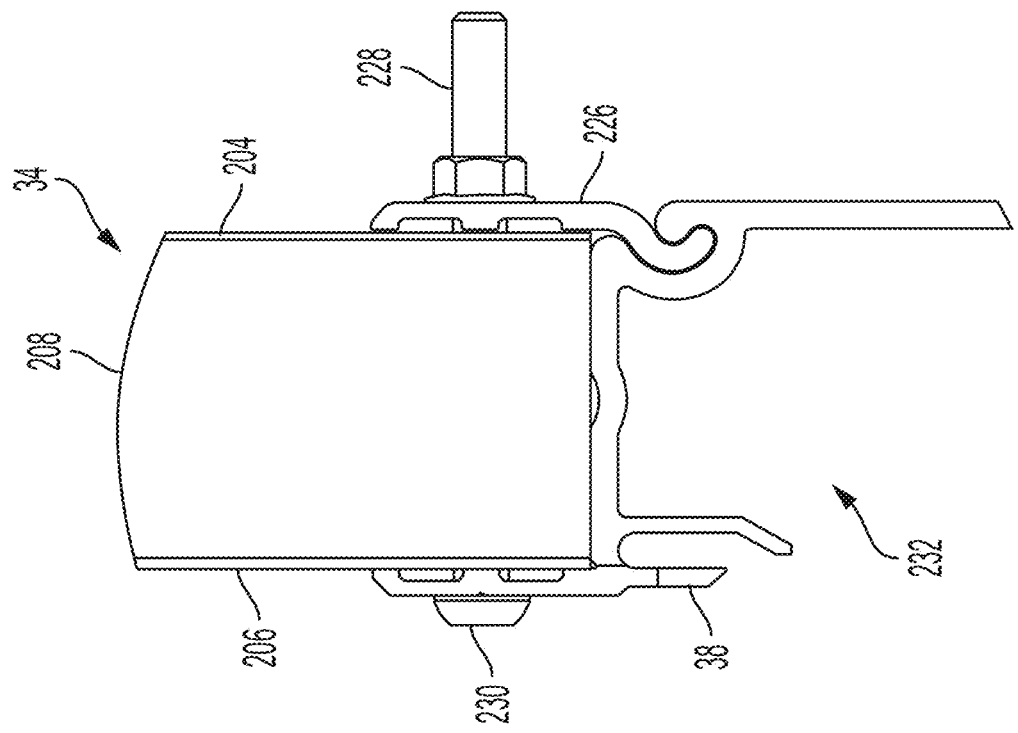
FIG. 21 is a partial section view of a sidewall and bottom rail as shown in FIGS. 1 and 6.
Figure 20:
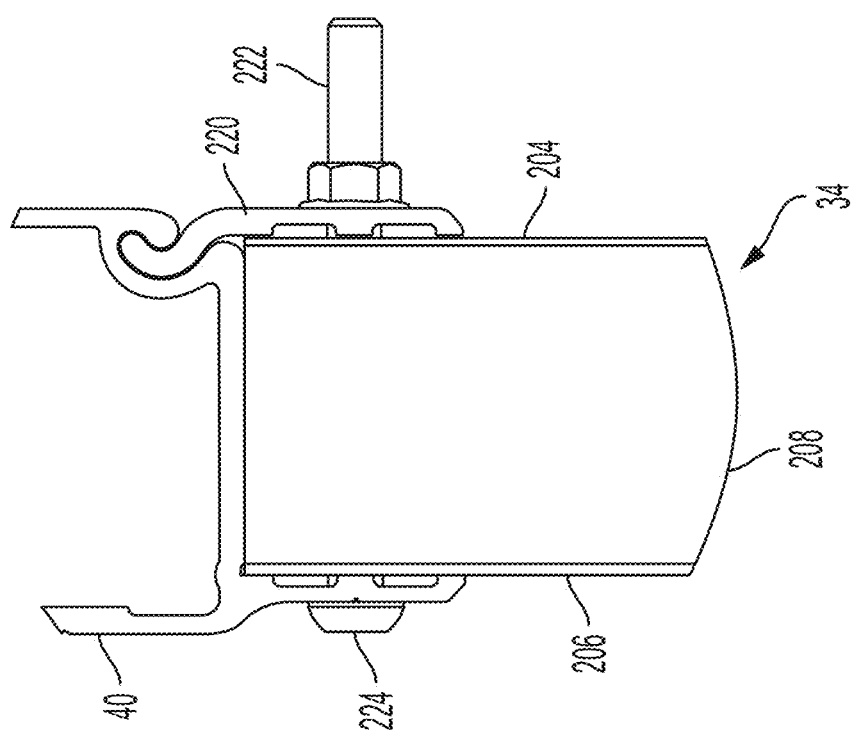
FIG. 20 is a partial section view of a sidewall and top rail as shown in FIGS. 1 and 6.

As noted above, fasteners may be used along the length of the bottom rail and top rail to secure each sidewall 34 through the aluminum bars 210 and 212 and through inner and outer panels 204 and 206. FIG. 20, for example, illustrates a top end of an example sidewall 34 received between a bottom flange of a top rail 40 that faces the trailer's exterior and an inner attachment flange 220. A bolt 222 having a bolt head 224 may extend through top rail inner attachment flange 220, the bottom flange of top rail 40, panels 204 and 206, and an aluminum bar 210 or 212 (not shown). Similarly, referring to FIG. 21, a bottom portion of an example sidewall 34 is received between an upper outer flange of a bottom rail 38 and a bottom rail inner attachment flange 226. A bolt 228 may extend entirely through upper flange of top rail 38, bottom rail inner attachment flange 226, panels 204 and 206, and an aluminum bar 210 or 212 (not shown). Bolt heads 224 and 230 may protrude from the top rail and bottom rail, respectively, at the trailer's exterior. Sidewalls 34 are not fastened, in this example, through sub-panels 218. It will be noted that the example bottom rail 38 defines an open space facing towards the trailer's exterior. As indicated in FIG. 1, this space may secure a bottom panel 234 on which are disposed light reflective strips or other features.

While one or more embodiments of the disclosure are described herein, it should be appreciated by those skilled in the art that various modifications and variations can be made in such embodiments without departing from the scope and spirit of this disclosure. Accordingly, it should be understood that the elements of one embodiment may be combined with another embodiment to create a still further embodiment. It is intended that the present disclosure cover such modifications and variations as come within the scope and spirit of the disclosure, the appended claims, and their equivalents.

What is claimed:

1. A semi-trailer for use with a tractor, comprising:
   a body comprising
      a cargo deck,
      a front wall at a forward end of the cargo deck, and a pair of sidewalls, a first sidewall of the pair of sidewalls attached to a side of the cargo deck opposite a side of the cargo deck to which a second sidewall of the pair of sidewalls is attached, each of the first sidewall and the second sidewall extending between the front wall and a rearward end of the cargo deck so that the first sidewall and the second sidewall define a cargo volume above the cargo deck;

a king pin extending downward from a forward end of the cargo deck opposite the rearward end; and a plurality of wheels extending below the rearward end of the cargo deck, wherein each sidewall comprises an inner generally planar panel that faces the cargo volume, an outer generally planar panel that forms an outer surface of the trailer, and a center panel disposed between and attached to the inner panel and the outer panel that separates the inner panel from the outer panel, wherein the center panel comprises a frame of hollow tubes, the hollow tubes formed from aluminum, and wherein the outer panel is attached to the center panel by an adhesive so that an outer surface of the outer panel defines an area opposite the center panel through which no fastener between the outer panel and the center panel protrudes.

2. The semi-trailer as in claim 1, wherein the area opposite the center panel comprises at least half of a longitudinal length of the outer panel and at least half of a vertical height of the outer panel.

3. The semi-trailer as in claim 1, wherein the front wall is separate from the cargo deck.

4. The semi-trailer as in claim 1, wherein, at each of the first sidewall and the second sidewall, the area extends from a bottom edge of the sidewall to a top edge of the sidewall.

5. The semi-trailer as in claim 4, wherein the body comprises a front frame attached to the sidewalls of the pair of sidewalls and the front wall and a rear frame attached to the sidewalls of the pair of sidewalls at rear ends thereof opposite the front frame, and wherein the area extends from the front frame to the rear frame.

6. The semi-trailer as in claim 1, wherein the inner panel comprises polypropylene.

7. The semi-trailer as in claim 1, wherein the outer panel comprises polypropylene.

8. The semi-trailer as in claim 1, wherein the center panel comprises a composite material formed of a honeycomb structure.

9. The semi-trailer as in claim 1, wherein the center panel comprises a frame of hollow tubes and a material formed of a honeycomb structure.

10. The semi-trailer as in claim 1, wherein the outer panel is seamless within the area.

11. A trailer for use with a truck having a tractor, comprising:

a wheeled chassis having at least one wheeled axle at a rearward end of the wheeled chassis and a support at a forward end of the wheeled chassis; and a body comprising
a cargo deck supported by the wheeled chassis,
a front wall at the forward end, and
a pair of sidewalls attached to opposing sides of the deck and extending between the front wall and a rearward end of the cargo deck so that at least the sidewalls define a cargo area above the cargo deck, wherein the cargo deck comprises at least one hopper having a funnel at a bottom portion thereof that defines and surrounds an opening that opens to a space beneath the trailer, and wherein the funnel is formed of a single piece of molded polymer, wherein the funnel has four generally planar sides, each side defining two edges of said side that diverge from each other from the opening to a top of the funnel, and wherein, between each pair of adjacent said generally planar sides, the funnel comprises a corner section having two side edges, wherein a first side edge of the corner section is also a said edge of a first said generally planar side adjacent the corner section and a second side edge of the corner section is also a said edge of a second said generally planar side adjacent the corner section opposite the first said generally planar side, so that the two side edges converge toward each other from the opening to the top of the funnel.

12. The trailer as in claim 11, wherein a surface of each said corner section facing an interior of the funnel is concave with respect to the interior.

\* \* \* \* \*